US012603851B2

(12) United States Patent
Rozenbaum

(10) Patent No.: US 12,603,851 B2
(45) Date of Patent: Apr. 14, 2026

(54) DATA PATH RULE MANAGEMENT IN VIRTUAL SWITCH

(71) Applicant: Mellanox Technologies, Ltd., Yokneam (IL)

(72) Inventor: Chen Rozenbaum, Be'er Ya'akov (IL)

(73) Assignee: Mellanox Technologies, Ltd., Yokneam (IL)

( * ) Notice: Subject to any disclaimer, the term of this patent is extended or adjusted under 35 U.S.C. 154(b) by 299 days.

(21) Appl. No.: 18/414,805

(22) Filed: Jan. 17, 2024

(65) Prior Publication Data

US 2025/0233834 A1 Jul. 17, 2025

(51) Int. Cl.
| | |
|---|---|
| *H04L 49/00* | (2022.01) |
| *H04L 43/062* | (2022.01) |
| *H04L 43/50* | (2022.01) |

(52) U.S. Cl.
CPC ............ *H04L 49/70* (2013.01); *H04L 43/062* (2013.01); *H04L 43/50* (2013.01); *H04L 49/3009* (2013.01)

(58) Field of Classification Search
CPC ....... H04L 49/70; H04L 43/062; H04L 43/50; H04L 49/3009
See application file for complete search history.

(56) References Cited

U.S. PATENT DOCUMENTS

| | | | | |
|---|---|---|---|---|
| 10,868,737 | B2 * | 12/2020 | Huang | .................... H04L 63/20 |
| 2014/0195666 | A1 * | 7/2014 | Dumitriu | ................ H04L 43/55 |
| | | | | 709/223 |
| 2017/0310478 | A1 * | 10/2017 | Karame | .................. H04L 9/088 |
| 2020/0014621 | A1 * | 1/2020 | Yoo | .......................... H04L 45/64 |
| 2024/0089257 | A1 * | 3/2024 | Prabhu Muraleedhara Prabhu .... | |
| | | | | H04L 41/145 |

* cited by examiner

*Primary Examiner* — Benjamin M Thieu
(74) *Attorney, Agent, or Firm* — Lowenstein Sandler LLP

(57) ABSTRACT

Technologies for optimizing performance of virtual switches in networking and accelerated computing are described. A virtual switch can identify an addition of a first data path (DP) rule in a flow table. The virtual switch can determine that the first DP rule and a second DP rule in the flow table overlap. The addition of the first DP rule causes the second DP rule to be deleted in the flow table. Before the second DP rule is deleted, the virtual switch can simulate receipt of a simulated packet comprising the specified portion of the network header corresponding to a second DP rule identifier of the second DP rule. The receipt of the simulated packet causes a third DP rule to be added to the flow table. After the third DP rule is added, the virtual switch can delete the second DP rule.

20 Claims, 5 Drawing Sheets

300

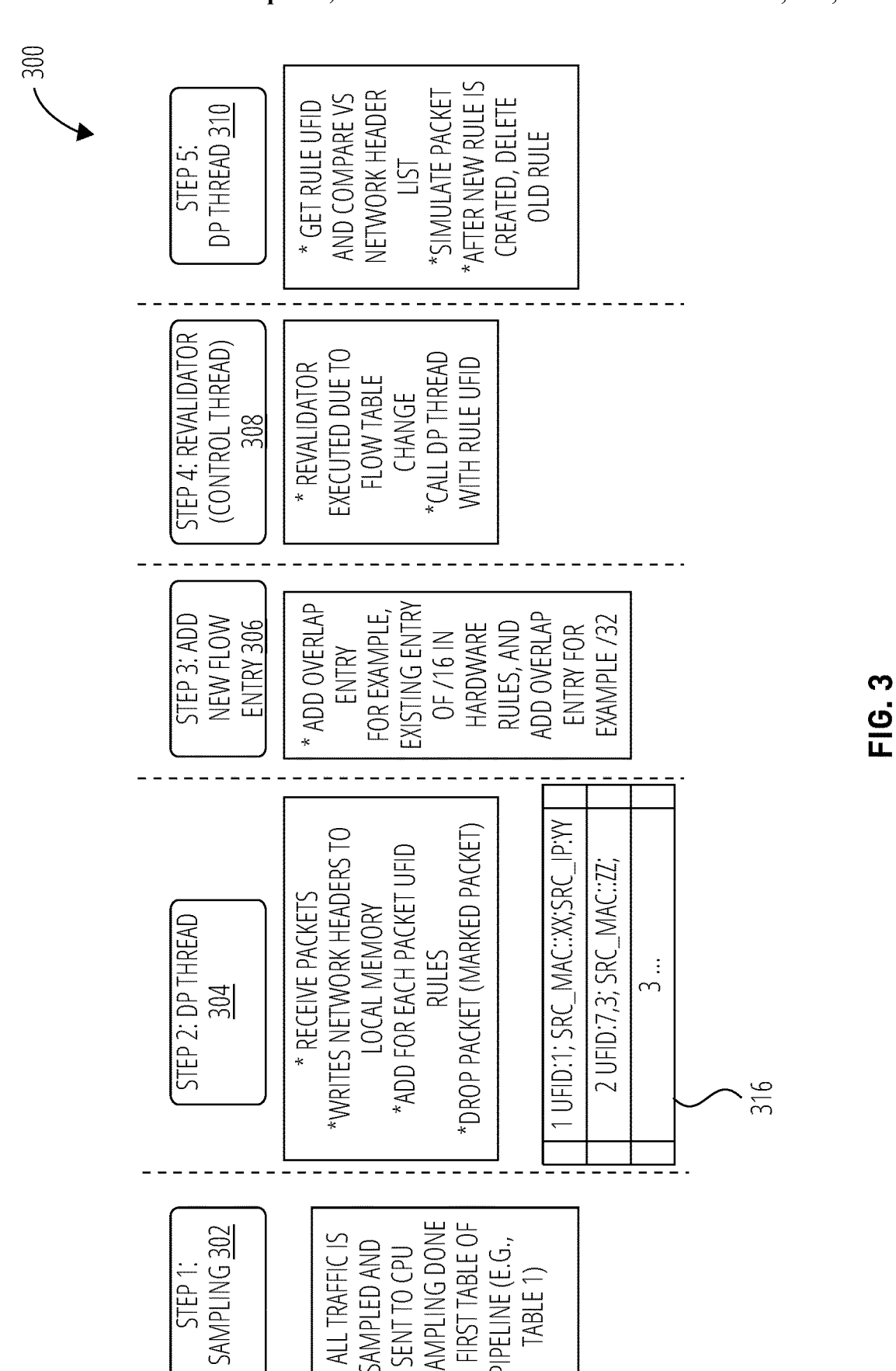

STEP 5:
DP THREAD 310

* GET RULE UFID
AND COMPARE VS
NETWORK HEADER
LIST
* SIMULATE PACKET
* AFTER NEW RULE IS
CREATED, DELETE
OLD RULE

STEP 4: REVALIDATOR
(CONTROL THREAD)
308

* REVALIDATOR
EXECUTED DUE TO
FLOW TABLE
CHANGE
* CALL DP THREAD
WITH RULE UFID

STEP 3: ADD
NEW FLOW
ENTRY 306

* ADD OVERLAP
ENTRY
FOR EXAMPLE,
EXISTING ENTRY
OF /16 IN
HARDWARE
RULES, AND
ADD OVERLAP
ENTRY FOR
EXAMPLE /32

STEP 2: DP THREAD
304

* RECEIVE PACKETS
* WRITES NETWORK HEADERS TO
LOCAL MEMORY
* ADD FOR EACH PACKET UFID
RULES
* DROP PACKET (MARKED PACKET)

| 1 UFID:1; SRC_MAC::XX; SRC_IP:YY |
| 2 UFID:7,3; SRC_MAC::ZZ; |
| 3 ... |

316

STEP 1:
SAMPLING 302

* ALL TRAFFIC IS
SAMPLED AND
SENT TO CPU
* SAMPLING DONE
IN FIRST TABLE OF
PIPELINE (E.G.,
TABLE 1)

FIG. 3

400

SAMPLE NETWORK TRAFFIC DATA AT A SPECIFIED SAMPLING RATE TO GENERATE A SAMPLED COPY OF THE NETWORK TRAFFIC DATA <u>402</u>

STORE A DATA PATH (DP) RULE IDENTIFIER AND A SPECIFIED PORTION OF A NETWORK HEADER FOR EACH PACKET OF THE SAMPLED COPY <u>404</u>

IDENTIFY A CHANGE TO A CONFIGURATION SETTING OF THE VIRTUAL SWITCH, WHEREIN THE CHANGE TO THE CONFIGURATION SETTING CAUSES A FIRST DP RULE TO BE DELETED IN A FLOW TABLE OF THE VIRTUAL SWITCH <u>406</u>

BEFORE DELETE THE FIRST DP RULE, SIMULATING RECEIPT OF A SIMULATED PACKET COMPRISING THE SPECIFIED PORTION OF THE NETWORK HEADER CORRESPONDING TO A FIRST DP RULE IDENTIFIER OF THE FIRST DP RULE, WHEREIN THE RECEIPT OF THE SIMULATED PACKET CAUSES A SECOND DP RULE TO BE ADDED TO THE FLOW TABLE <u>408</u>

AFTER ADDING THE SECOND DP RULE, DELETE THE FIRST DP RULE <u>410</u>

FIG. 4

500

SAMPLE NETWORK TRAFFIC DATA AT A SPECIFIED SAMPLING RATE TO GENERATE A SAMPLED COPY OF THE NETWORK TRAFFIC DATA 502

STORE A DATA PATH (DP) RULE IDENTIFIER AND A SPECIFIED PORTION OF A NETWORK HEADER FOR EACH PACKET OF THE SAMPLED COPY 504

IDENTIFY AN ADDITION OF A FIRST DP RULE IN A FLOW TABLE 506

DETERMININGTHAT THE FIRST DP RULE AND A SECOND DP RULE IN THE FLOW TABLE OVERLAP, WHEREIN THE ADDITION OF THE FIRST DP RULE CAUSES A SECOND DP RULE TO BE DELETED IN THE FLOW TABLE 508

BEFORE DELETE THE SECOND DP RULE, SIMULATING RECEIPT OF A SIMULATED PACKET COMPRISING THE SPECIFIED PORTION OF THE NETWORK HEADER CORRESPONDING TO A SECOND DP RULE IDENTIFIER OF THE SECOND DP RULE, WHEREIN THE RECEIPT OF THE SIMULATED PACKET CAUSES A THIRD DP RULE TO BE ADDED TO THE FLOW TABLE 510

AFTER ADDING THE THIRD DP RULE, DELETE THE SECOND DP RULE 512

FIG. 5

DATA PATH RULE MANAGEMENT IN VIRTUAL SWITCH

TECHNICAL FIELD

At least one embodiment pertains to processing resources used to perform and facilitate operations for identifying a change to a configuration setting of a virtual switch and adding a data path (DP) rule to reconcile the overlapping DP rules. For example, at least one embodiment pertains to processors or computing systems used to provide and enable a virtual switch to determine that DP rules overlap and add a new DP rule to avoid transient disruptions of the virtual switch before deleting one of the overlapping rules, according to various novel techniques described herein.

BACKGROUND

Open vSwitch (OVS) is an open-source, multi-layer virtual switch that is used to manage network traffic in virtualized environments, particularly in data centers and cloud computing platforms. OVS provides network connectivity between virtual machines (VMs), containers, and physical devices. OVS is widely used in virtualization and cloud technologies and is a critical component of many software-defined networking (SDN) and network virtualization solutions. In the context of OVS, an "OVS hiccup" is a term used to describe a brief and temporary disruption or interruption in network traffic processing or forwarding capabilities of OVS. This disruption can occur for various reasons, and it usually refers to a short-lived period during which OVS experiences a performance issue or a delay in its normal operation. The OVS hiccup can be caused by configuration changes, such as modifications to OVS configuration settings, addition, or removal of OpenFlow (OF) rules, which can sometimes lead to transient disruptions as the virtual switch adjusts to the modifications to the OVS configuration settings.

BRIEF DESCRIPTION OF DRAWINGS

Various embodiments in accordance with the present disclosure will be described with reference to the drawings, in which:

FIG. 3 is a flow diagram of processing flow of two threads of a virtual switch according to at least one embodiment.

FIG. 4 is a flow diagram of an example method of avoiding disruption in network processing in a virtual switch according to at least one embodiment.

FIG. 5 is a flow diagram of an example method of managing DP rules in a flow table in a virtual switch according to at least one embodiment.

DETAILED DESCRIPTION

Figure 1:
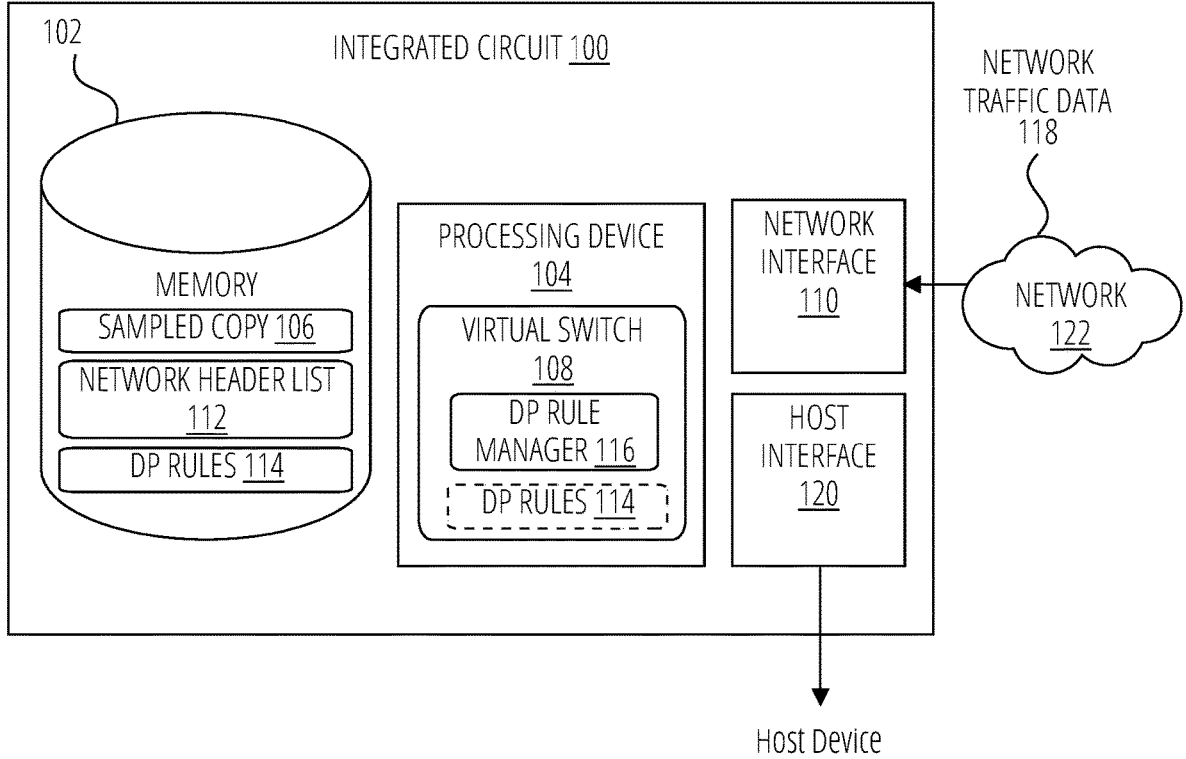
FIG. 1 is a block diagram of an integrated circuit with a data path (DP) rule manager of a virtual switch according to at least one embodiment.

Technologies for optimizing performance of virtual switches in networking and accelerated computing are described. A virtual switch, often found in virtualized computing environments, is a software application that allows virtual machines (VMs) on a single physical host to communicate with each other and with the external network. The virtual switch can provide network connectivity between VMs, containers, and physical devices. The virtual switch can emulate the functionality of a physical network switch but operates at a software level within a hypervisor or a host operating system. The virtual switch can manage network traffic, directing data packets between VMs on the same host or between VMs and the physical network using ports. These ports can be configured for various policies like security settings, Quality of Service (QoS) rules, etc. The virtual switch can segment network traffic to provide isolation between different virtual networks. The virtual switch can provide an interface between the virtualized environment and the physical network, allowing VMs to communicate outside their host. The virtual switch can support standard networking protocols and features, such as virtual local area network (VLAN) tagging, Layer 2 forwarding, Layer 3 capabilities, and the like. OVS can support the OpenFlow Protocol, allowing the virtual switch to be controlled by a network controller to make decisions about how traffic should be routed through the network. A network controller, such as a software-defined networking (SDN) controller, is a centralized entity that manages flow control to the networking devices. It is the "brain" of the network, maintaining a comprehensive view of the network and making decisions about where to send packets. The OpenFlow (OF) Protocol enables the controller to interact directly with the forwarding plane of network devices, such as switches and routers, both physical and virtual. An OF configuration refers to the setup and management of network behavior using the OpenFlow protocol within an SDN environment. It involves defining flow rules and actions to control how traffic is handled by network devices, usually managed centrally by an SDN controller. An OF configuration can include flow tables that contain rules for how packets should be handled. Each flow table contains a set of flow entries. The flow entry defines what to do with packets that match certain criteria. An entry can have three parts: match fields, actions, and counters. The match fields define packet attributes to match, such as source/destination Internet Protocol (IP) addresses, Media Access Control (MAC) addresses, port numbers, VLAN tags, etc. The Actions can define what to do with a matching packet, such as forwarding it to a specific port, modifying fields in the packet, or dropping it. The counters can be used to keep track of the number of packets and bytes for each flow. The network controller can use control messages to manage flow entries in the switches. It can add, update, or delete flow entries. Optional configurations can include group tables for more advanced forwarding actions like multicasting, load balancing, etc. It should be noted that OVS is one type of virtual switch technology, but there are other virtual switch technologies, such as SDN-based switches.

As described above, temporary disruptions or interruptions in network traffic processing or forwarding capabilities can be caused by configuration changes, such as modifications to OVS configuration settings, addition, or removal of OF rules, which can sometimes lead to transient disruptions as the virtual switch adjusts to the new settings. These temporary disruptions or interruptions can cause a short-lived period during which OVS experiences a performance issue or a delay in its normal operation. These temporary disruptions or interruptions can occur in other virtual switch technologies when there are changes to configuration settings that cause overlaps in the flow rules.

Aspects and embodiments of the present disclosure address these problems and others by technology to identify changes to configuration settings, identify overlapping rules, and add a new rule to avoid transient disruptions of the virtual switch before deleting an overlapping rule. Aspects and embodiments of the present disclosure can identify an addition of a first data path (DP) rule in a flow table and determine that the first DP rule and a second DP rule in the flow table overlap in response to the addition of the first DP rule in the flow table. The addition of the first DP rule causes the second DP rule to be deleted in the flow table. Before the second DP rule is deleted, the virtual switch simulates receipt of a simulated packet. The receipt of the simulated packet causes a third DP rule to be added to the flow table. After the third DP rule is added, the virtual switch deletes the second DP rule. Aspects and embodiments of the present disclosure can sample network traffic data at a specified sampling rate to generate a sampled copy of the network traffic data and store a data path (DP) rule identifier and a specified portion of a network header for each packet of the sampled copy. The virtual switch can generate the simulated packet with the specified portion of the network header corresponding to a second DP rule identifier of the second DP rule. As noted above, the receipt of the simulated packet causes the third DP rule to be added to the flow table. Aspects and embodiments of the present disclosure can avoid the temporary disruptions or interruptions and avoid the short-lived periods during which the virtual switch experiences performance issues or delays in its normal operation.

Aspects and embodiments of the present disclosure can reduce network recovery time and result in higher bandwidth when changes to the configuration settings occur. For example, an OVS hiccup happens when a new OpenFlow entry is added to the OVS, and the new OpenFlow entry overlaps an existing OVS data path entry. Aspects and embodiments of the present disclosure can provide OVS hiccup optimization by identifying that entries overlap and creating additional DP rules to handle the overlap, ensuring continuous operation without disruption or interruption.

Some aspects and embodiments of the present disclosure are described herein with respect to OVS and include terminology that is specific to OVS and OpenFlow, such as Universal Flow Identifier (UFID), Poll Mode Driver (PMD) thread, OF rules, or the like. However, some aspects and embodiments of the present disclosure can be used in other virtual switching technologies. Similarly, various embodiments are described in the context of a data processing unit (DPU), but can also be used in other virtual switch environments, including virtual bridges, switches, network interface cards (NICs), network interface devices, or the like.

FIG. 1 is a block diagram of an integrated circuit 100 with a DP rule manager 116 of a virtual switch 108 according to at least one embodiment. The integrated circuit 100 can be a DPU, a NIC, a switch, or the like. The integrated circuit 100 includes a memory 102, a processing device 104, a network interface 110, and a host interface 120. The processing device 104 is coupled to the memory 102, the host interface 120, and the network interface 110. The processing device 104 hosts the virtual switch 108. The virtual switch 108 is a software application that provides network connectivity between VMs executed on the same integrated circuit 100 or a separate host device, containers, and/or physical devices. In short, the virtual switch 108 allows VMs on a single physical host to communicate with each other and with the external network 122. The virtual switch 108 can emulate the functionality of a physical network switch but operates at a software level within a hypervisor or a host operating system. The virtual switch 108 can manage network traffic data 118, directing data packets between VMs on the same host or between VMs and the physical network using ports. These ports can be configured for various policies like security settings, QoS rules, etc. The virtual switch 108 can segment network traffic to provide isolation between different virtual networks. The virtual switch 108 can provide an interface between the virtualized environment and the physical network, allowing VMs to communicate outside their host. The virtual switch 108 can support standard networking protocols and features, such as VLAN tagging, Layer 2 forwarding, Layer 3 capabilities, and the like.

In at least one embodiment, the virtual switch 108 can use the OVS and OF technologies. The virtual switch 108 can be controlled by a network controller to make decisions about how traffic should be routed through the network. As described herein, a network controller (e.g., SDN controller) is a centralized entity that manages flow control to the networking devices. The OF protocol can be used to interact directly with the forwarding plane of network devices, such as virtual or physical switches and routers. In at least one embodiment, the virtual switch 108 can use flow tables that contain rules for how packets should be handled. Each flow table contains a set of flow entries. The flow entry defines what to do with packets that match certain criteria. An entry can have three parts: match fields, actions, and counters. The match fields define packet attributes to match, such as source/destination Internet Protocol (IP) addresses, MAC addresses, port numbers, VLAN tags, etc. The Actions can define what to do with a matching packet, such as forwarding it to a specific port, modifying fields in the packet, or dropping it. The counters can be used to keep track of the number of packets and bytes for each flow. Since the virtual switch 108 is virtualized, the virtual switch 108 can create rules at a software level, a data path (DP) level, and at a hardware level. A rule created at the software level is referred to as a software (SW) rule or an OF rule. A rule created at the DP level is referred to as a DP rule. A rule created at the hardware level is referred to as a hardware (HW) rule. When a SW rule is created, corresponding DP and HW rules are created. A network controller can add, update, or delete flow entries, changing the configuration settings. As described herein, changes to the configuration settings can cause disruptions or interruptions in the operations. The DP rule manager 116 can avoid these disruptions or interruptions as described in more detail below.

In at least one embodiment, the virtual switch 108 is an OVS-based switch. In the OVS-based switch, the virtual switch 108 can provide Layer 2 Switching, Layer 3 Routing, VLAN tagging, tunneling protocols (e.g., VXLAN, GRE, and Geneve), flow-based forwarding, OpenFlow Support, integration with virtualization platforms (e.g., VMware, KVM, Xen, and others, enabling network connectivity for virtual machines and containers), extensibility, traffic monitoring and mirroring, security, multi-platform support (e.g., Linux, FreeBSD, Windows, etc.), and the like. For Layer 2 Switching, the virtual switch 108 acts as a Layer 2 Ethernet switch, enabling the forwarding of Ethernet frames between different network interfaces, including virtual and physical ports. For Layer 3 Routing, the virtual switch 108 supports Layer 3 IP routing, allowing it to route traffic between different IP subnets and perform IP-based forwarding. The virtual switch 108 can support VLAN tagging and allow for the segmentation of network traffic into different VLANs using VLAN tagging. The virtual switch 108 can use flow-based forwarding where network flows are classified based on their characteristics, and packet forwarding decisions are made based on flow rules, as well as enforce security policies and access control. OVS is commonly used in data center and cloud environments to provide network agility, flexibility, and automation. It plays a vital role in creating and managing virtual networks, enabling network administrators to adapt to the changing demands of modern, dynamic data centers.

In another embodiment, the virtual switch 108 is a Standard Virtual Switch or a Distributed Virtual Switch of a hypervisor. In another embodiment, the virtual switch 108 is an SDN-based switch that is integrated with an SDN controller. The integrated circuit 100 can be used in data centers, cloud computing environments, development and testing environments, network function virtualization (NFV) environments, or the like. The virtual switch 108 can be used in a data center where server virtualization is common to facilitate communication within and between servers efficiently. The virtual switch 108 in the cloud computing environment can enable multi-tenant networking, allowing different clients to have isolated network segments. The virtual switch 108 can allow virtual network functions (e.g., VNFs) to be connected and managed within virtual infrastructures. Some advantages of the virtual switch 108 are that the virtual switch 108 can be easily configured or reconfigured without physical intervention, can reduce the need for physical network hardware and associated maintenance, and offers the ability to create isolated networks for different applications or tenants. In summary, the virtual switch 108 is a software-based device that performs the networking functionalities of a physical switch in a virtualized environment (e.g., data centers and cloud computing environments) and provides flexibility, isolation, and efficient network management in the virtualized environment.

In the context of OVS, an "OVS hiccup" is a term used to describe a brief and temporary disruption or interruption in the network traffic processing or forwarding capabilities of OVS. This disruption can occur for various reasons, and it usually refers to a short-lived period during which OVS experiences a performance issue or a delay in its normal operation. The reason for the OVS hiccup for this invention is a hiccup caused by configuration changes, i.e., modifications to OVS configuration settings or the addition, modification, or removal of open flow rules, which can sometimes lead to transient disruptions as the switch adjusts to the new settings. For example, a configuration change that includes deleting a DP rule, and therefore, the OVS rule in hardware, results in new packets being sent to OVS user space for software processing, instead of going through hardware. This reduces the network bandwidth of the network device.

The virtual switch 108 can include a DP rule manager 116 to provide OVS hiccup optimization due to OF configuration changes. The DP rule manager 116 can mirror all network traffic data 118 at a specific configurable rate in the memory 102, resulting in the packets being sent to OVS user-space processing. The mirrored traffic can be saved in the memory 102 as a sampled copy 106. The mirror will be done as a pre-processing stage, i.e., as part of OVS infrastructure, not visible to the user. The mirror traffic can be marked by hardware as "mirrored traffic," so later the mirrored traffic can be discarded. For each packet, the DP rule manager 116 can save to memory its network headers and OVS UFID. The list of all packets' network headers and UFID can be called a network header list 112. The DP rule manager 116 can include two threads, including a DP thread (e.g., "PMD thread") and a control thread (also referred to as "OVS Revalidator"). When a new OF configuration is added, for example, a configuration change that causes the deletion of a DP rule, the following process can be performed: a. OVS Revalidator will be executed due to the change to a flow table; b. OVS Revalidator will call PMD Thread with "delete" operation to delete OVS DP rule; c. The PMD thread will get the OVS Revalidator request and compare the UFID in the network header list 112, and if there is a match, the PMD will simulate a new simulated packet according to the network header with the corresponding UFID; d. The simulated packet will result in a new DP entry, added to OVS and to HW; e. After the new DP entry is added, the PMD thread will delete the entry from HW; f. The network header list 112 can have the same aging time limit as the OVS configuration.

In at least one embodiment, the DP rule manager 116 can perform and facilitate operations for identifying a change to a configuration setting of the virtual switch 108 and add a data path rule 114 (DP rule) to reconcile the overlapping DP rules. This is not done per packet. The overlap check is triggered when a new rule is added. In this embodiment, the DP rule manager 116 is implemented in the integrated circuit 100 with memory 102, processing device 104, and a network interface 110. In other embodiments, the DP rule manager 116 can be implemented in processors, computing systems, central processing units (CPUs), data processing units (DPUs), network interface cards (NICs), or the like. The underlying hardware can host the virtual switch 108. The virtual switch 108 can determine that DP rules overlap and add a new DP rule to avoid transient disruptions of the virtual switch 108 before deleting one of the overlapping rules, according to various novel techniques described herein.

In at least one embodiment, the virtual switch 108 can sample the network traffic data 118 at a specified sampling rate to generate a sampled copy 106 of the network traffic data. The virtual switch 108 can mark each packet of the sampled copy 106 of the network traffic data 118 with an indication to be discarded. The virtual switch 108 can discard each packet including the indication to be discarded after storing the DP rule identifier and the specified portion of the network header in the network header list 112. The virtual switch 108 can store a DP rule identifier (e.g., UFID: 1) and a specified portion of a network header for each packet of the sampled copy (e.g., 1.1.1.1/16). The specified portion of the network header can include one or more fields corresponding to at least one of layer 2, layer 3, or layer 4 of the network header. The specified portion can be a source MAC address, a destination MAC address, a source IP address, a destination IP address, a source port, a destination port, a protocol identifier, a packet size, a maximum packet size, or the like. In at least one embodiment, the virtual switch 108 can store an entry in a network header list 112, where the entry is indexed by the DP rule identifier and includes the specified portion of the network header. For example, the network traffic data 118 can include a first packet with the destination internet protocol (IP) address of 1.1.1.1. Initially, there may not be any hardware rules or DP rules defined for incoming data traffic. Initially, the DP rule manager 116 can create a software rule (e.g., OpenFlow (OF) rule) by creating a new flow entry of a flow table, such as Match:Dst ip (1.1.1.1/16)->Action:P0. For this rule, network traffic data 118 with the following example destination IP addresses would match the rule and be forwarded to a specified port, port 0 (P0):

Actual traffic:
1.1.1.2
1.1.2.1

In short, the rule specifies that any network traffic data with the destination IP address of 1.1.x.x (where x is any value between 0 and 255). However, if a new overlapping rule were added in conventional systems, such as Match:Dst ip (1.1.1.1/32)->Action:P1, which would forward network traffic destined to 1.1.1.1 to go to port 1 (P1), the addition of the overlapping rule would create a brief and temporary disruption or interruption (also referred to as a "hiccup") in the network traffic processing or forwarding capabilities. In a conventional system, the addition of the overlapping rule Match:Dst ip (1.1.1.1/32)->Action:P1 cause the initial rule of Match:Dst ip (1.1.1.1/16)->Action:P0 to be deleted, causing the disruption or interruption.

In contrast, the DP rule manager 116 can determine that the new rule is overlapping and create one or more DP rules (and corresponding HW rules) to avoid the disruption or interruption without software involvement. Continuing with this example, the DP rule manager 116 can identify an addition of a new rule Match:Dst ip (1.1.1.1/32)->Action:P1 in a flow table and determine that the new rule Match:Dst ip (1.1.1.1/32)->Action:P1 and the original rule Match:Dst ip (1.1.1.1/16)->Action:P0 overlap in response to the addition of the new rule. Before the original rule Match:Dst ip (1.1.1.1/16)->Action:P0 is deleted from the flow table, the DP rule manager 116 can simulate receipt of a simulated packet with the specified portion of the network header corresponding to a DP rule identifier of the original rule. The receipt of the simulated packet causes a new DP rule to be added to the flow table to ensure that network traffic data 118 destined for the other destination IP addresses are not disrupted by the addition of the new rule. In this example, in response to the simulated packet, the DP rule manager 116 can create a new rule Match:Dst IP (1.1.1.2)→Action:P0, so that the network traffic data 118 destined to 1.1.1.2 continues to be forwarded to port 0, P0. After the new rule Match:Dst ip (1.1.1.1/32)->Action:P1 is added to the flow table, the original rule Match:Dst ip (1.1.1.1/16)->Action:P0 can be deleted from the flow table.

In another example, if the actual traffic is as follows, the DP rule manager 116 would create two new rules:

Actual traffic:
1.1.1.1
1.1.1.2
1.1.1.3

Before the original rule Match:Dst ip (1.1.1.1/16)->Action:P0 is deleted from the flow table, the DP rule manager 116 can simulate receipt of simulated packets with the specified portion of the network headers for the destination IP addresses of 1.1.1.2 and the 1.1.1.3. The receipt of the simulated packets causes new DP rules, and corresponding HW rules, to be added to the flow table to avoid disruption to the other destination IP addresses. In this example, in response to the simulated packets, the DP rule manager 116 can create a new rule Match:Dst IP (1.1.1.2)→Action:P0 and a new rule Match:Dst IP (1.1.1.3)->Action:P0, so that the network traffic data 118 destined to 1.1.1.2 and 1.1.1.3 continue to be forwarded to port 0, P0, while network traffic data 118 destined to 1.1.1.1 are forwarded to port 1, P1. After the new rule is added to the flow table, the original rule Match:Dst ip (1.1.1.1/16)->Action:P0 can be deleted from the flow table. After these new rules are created in hardware, the initial rule of 1.1.1.1/16 P0 can be deleted. In summary, the rules will be as follows before and after deleting the original rule:

BEFORE ORIGINAL RULE IS DELETED
1.1.1.1/16 P0
1.1.1.1/32 P1

1.1.1.2/32 P0
1.1.1.3/32 P0
AFTER ORIGINAL RULE IS DELETED
1.1.1.1/32 P1
1.1.1.2/32 P0
1.1.1.3/32 P0

In a further optimization, a single rule can be created for the last two rules, such as 1.1.1.x /31 P0. Although the examples use destination IP address, in other embodiments, the rules can be based on other fields of the network headers, such as source media access control (MAC) addresses (e.g., Aa:bb:cc:dd:ee:ff), or the like. Also, in other embodiments, other actions can be used, such as drop (Action: drop), modify packet IP address, or the like.

In at least one embodiment, the virtual switch 108 (or DP rule manager 116) can sample network traffic data 118 at a specified sampling rate to generate a sampled copy 106 of the network traffic data 118. The virtual switch 108 (or DP rule manager 116) can store a DP rule identifier and a specified portion of a network header for each packet of the sampled copy 106. The virtual switch 108 (or DP rule manager 116) can identify an addition of a first DP rule (e.g., a first UFID) in a flow table. It should be noted that the overlap check is not done per packet but is triggered when a new rule is added. The virtual switch 108 (or DP rule manager 116) can determine that the first DP rule and a second DP rule (e.g., a second UFID) in the flow table overlap in response to the addition of the first DP rule in the flow table. The addition of the first DP rule causes the second DP rule to be deleted in the flow table. However, before the second DP rule is deleted, the virtual switch 108 (or DP rule manager 116) can simulate receipt of a simulated packet with the specified portion of the network header corresponding to a second DP rule identifier of the second DP rule. The receipt of the simulated packet causes a third DP rule to be added to the flow table. After the third DP rule is added, the virtual switch 108 (or DP rule manager 116) can delete the second DP rule. In at least one embodiment, the virtual switch 108 can mark the simulated packet with an indication to be discarded. The virtual switch 108 can delete the simulated packet after the third DP rule is added to the flow table.

In at least one embodiment, the virtual switch 108 (or DP rule manager 116) can store the DP rule identifier and the specified portion of the network header for each packet in a list. To determine that the first DP rule and the second DP rule overlap, the virtual switch 108 (or DP rule manager 116) can compare a first DP rule identifier of the first DP rule with the DP rule identifiers in the list and determine that at least a portion of the first DP rule identifier and the second DP rule identifier match. For example, the rule identifiers do not have to be exact matches, but where at least a portion of the identifiers match. An example would be where the two rules (1.1.1.1/16) and (1.1.1.1/32) are not an exact match, but at least a portion of these identifiers match. As a result of the match, the virtual switch 108 (or DP rule manager 116) can generate the simulated packet comprising the specified portion of the network header corresponding to the second DP rule identifier.

In at least one embodiment, the processing device 104 includes a first thread and a second thread. The first thread processes packets of the network traffic data 118 and adds or removes DP rules in the flow table. The second thread is initiated in response to the addition of a DP rule (e.g., the first DP rule). The second thread sends, to the first thread, a request to delete the second DP rule, the request comprising a first DP rule identifier of the first DP rule. The first DP rule identifier can be used to create the simulated packet with the corresponding network header as described herein.

In at least one embodiment, the processing device 104 includes a first thread and a second thread. The first thread can add a rule to hardware to send packets with specific patterns to the processing device 104 to sample the network traffic data 118. The first thread can store the DP rule identifier and the specified portion, determine that the first DP rule and the second DP rule in the flow table overlap, simulate the receipt of the simulated packet, and delete the second DP rule. The second thread is initiated in response to the addition of the first DP rule and can send, to the first thread, a request to delete the second DP rule, the request including a first DP rule identifier of the first DP rule. The first thread can compare the first DP rule identifier of the first DP rule against the DP rule identifiers to obtain a match with the second DP rule identifier. The first thread can generate the simulated packet including the specified portion of the network header corresponding to the second DP rule identifier.

In at least one embodiment, the integrated circuit 100 can also host one or more hypervisors and one or more virtual machines (VMs). The network traffic data 118 can be directed to the respective VM by the virtual switch 108.

As described herein, the reason for the disruption or interruption is caused by configuration changes, including modifications to OVS configuration settings, addition, or removal of OF rules. The changes can lead to transient disruptions as the virtual switch adjusts to the new settings. However, using the DP rule manager 116, the virtual switch 108 can add DP and HW rules without software involvement to ensure that network traffic data that would otherwise be impacted by deleting an overlapping rule continue without disruption.

In at least one embodiment, the virtual switch 108 is part of a virtual switch infrastructure implemented in at least one of a data processing unit (DPU), a network interface card (NIC), or a switch. In at least one embodiment, the DP rule manager 116 can be implemented as part of a hardware-accelerated service on an agentless hardware product, such as a DPU, as illustrated and described below with respect to FIG. 2. That is, the integrated circuit 100 can be a DPU. The DPU can be a programmable data center infrastructure on a chip. The hardware-accelerated service can be part of the NVIDIA OVS-DOCA, developed by Nvidia Corporation of Santa Clara, California. OVS-DOCA, which is the new OVS infrastructure for DPU, is based on the open-source OVS with additional features, new acceleration capabilities, and the OVS backend is purely DOCA based. Alternatively, the DP rule manager 116 can be part of other services.

Figure 2:
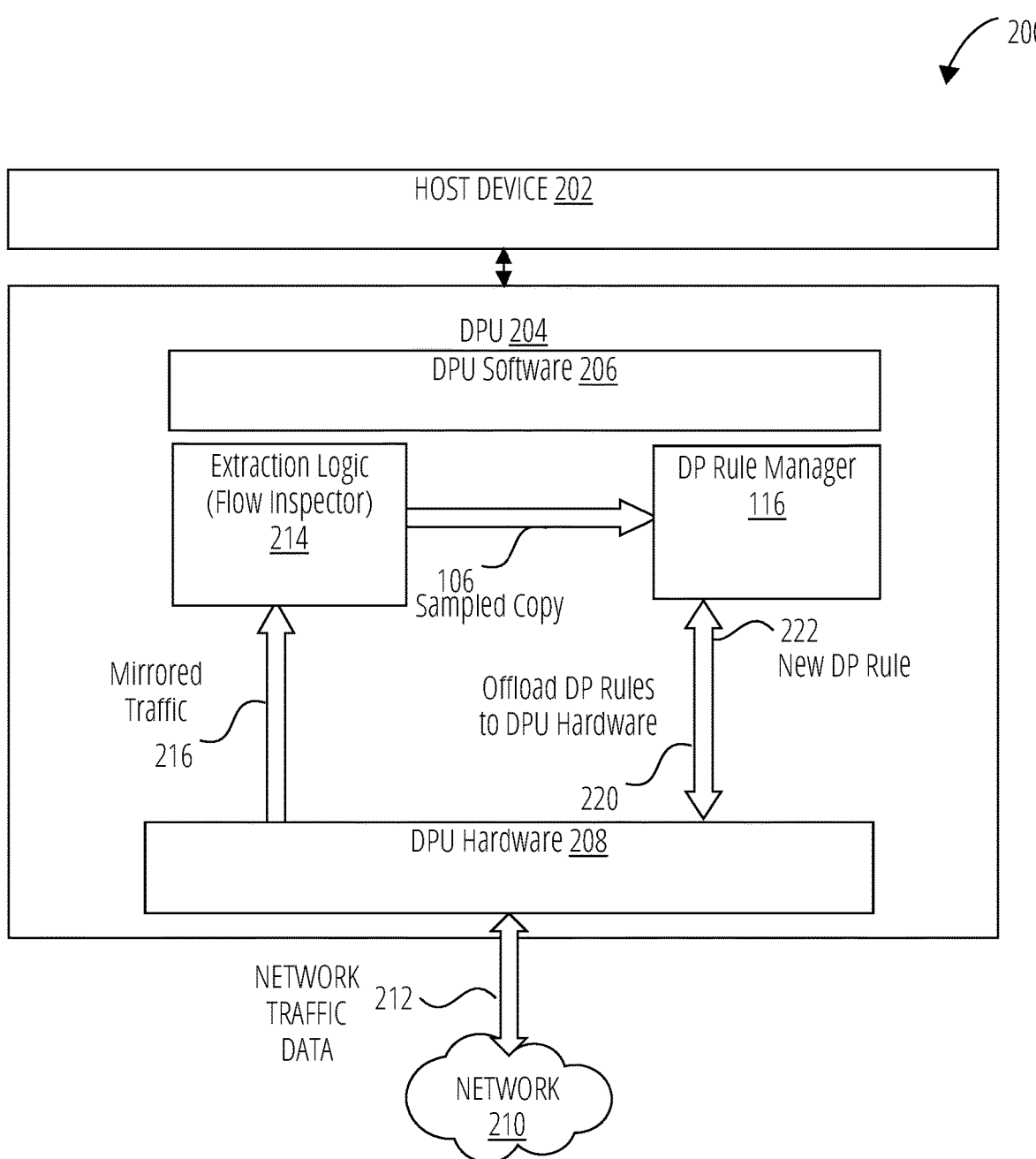
FIG. 2 is a block diagram of an example data processing unit (DPU)-based virtual switch architecture according to at least one embodiment.

FIG. 2 is a block diagram of an example DPU-based virtual switch architecture 200 according to at least one embodiment. The DPU-based virtual switch architecture 200 includes a DPU 204 coupled between a host device 202 and a network 210. In at least one embodiment, the DPU 204 is a System on a Chip (SoC) that is considered a data center infrastructure on a chip. The DPU 204 can include a network interface operatively coupled to the network 210. The network 210 may include a public network (e.g., the Internet), a private network (e.g., a local area network (LAN) or wide area network (WAN)), a wired network (e.g., Ethernet network), a wireless network (e.g., an 802.11 network or a Wi-Fi® network), a cellular network (e.g., a Long Term Evolution (LTE) network), routers, hubs, switches, server computers, and/or a combination thereof. The DPU can be coupled to a central processing unit (CPU) of the host device 202 via a host interface. The DPU 204 can handle network data path processing of network traffic data 118. The CPU can control path initialization and exception processing. The DPU 204 can be part of a data center and include one or more data stores, one or more server machines, and other components of data center infrastructure.

In at least one embodiment, the DP rule manager 116 (or virtual switch 108) can provide a sampling agent of the hardware-accelerated service. Alternatively, a sampling thread can be used to sample the network traffic data 118 and generate a sampled copy 106 of the network traffic data 118. The sampling agent can leverage the acceleration hardware engine (e.g., DPU hardware) to offload and filter network traffic based on predefined filters using the hardware capabilities of the acceleration hardware engine.

In at least one embodiment, the DPU 204 includes DPU hardware 208 and DPU software 206 (e.g., software framework with acceleration libraries). The DPU hardware can include a CPU (e.g., a single-core or multi-core CPU), one or more hardware accelerators, memory, one or more host interfaces, and one or more network interfaces. The software framework and acceleration libraries can include one or more hardware-accelerated services, including a hardware-accelerated service (e.g., NVIDIA DOCA), hardware-accelerated virtualization services, hardware-accelerated networking services, hardware-accelerated storage services, hardware-accelerated artificial intelligence/machine learning (AI/ML) services, hardware-accelerated service, and hardware-accelerated management services.

As illustrated in FIG. 2, the hardware-accelerated service can include data sampling logic 214 (e.g., OVS-DOCA) and DP rule manager 116, including a DP thread and a control thread. The DPU hardware 208 can receive network traffic data 212 over the network 210 from a second device (or multiple devices). The data sampling logic 214 (e.g., OVS-DOCA) can receive mirrored network traffic data 216. The mirrored network traffic data 216 is a mirror copy of network traffic data 212. The data sampling logic 214 can sample data packets directed to the host device 202 at a specified sampling rate. The data sampling logic 214 can be configured by a configuration file that specifies what type of data should be extracted from the network traffic data 212. The configuration file can specify one or more filters that extract for inclusion or remove from inclusion specified types of data from the network traffic data 212. Since the mirrored network traffic data 216 can be a copy of the network traffic data 212, the network traffic that does not meet the filtering criteria can be discarded or removed. The network traffic that meets the filtering criteria can be structured and streamed to the DP rule manager 116 for processing. For example, the configuration file can specify that all HyperText Transport Protocol (HTTP) traffic be extracted from the network traffic data 212. The configuration file can specify that all traffic on specific ports should be extracted from the network traffic data 212 for processing by the DP rule manager 116.

In at least one embodiment, the DP rule manager 116 can extract and store a DP rule identifier and a specified portion of a network header for each packet of the mirrored network traffic data 216. The specified portion of the network header can include one or more fields corresponding to at least one of layer 2, layer 3, or layer 4 of the network header of the packet. The DP rule manager 116 can store the DP rule identifier and the network header in a network header list. The DP rule manager 116 can identify a change in configuration settings, such as an addition of a first DP rule in a flow table. The DP rule manager 116 can determine that the first DP rule and a second DP rule in the flow table overlap in response to the addition of the first DP rule in the flow table.

The addition of the first DP rule causes the second DP rule to be deleted in the flow table. Before the second DP rule is deleted in the flow table, the DP rule manager 116 can simulate receipt of a simulated packet. The DP rule manager 116 can use the network header list to determine the specified portion of the network header corresponding to the second DP rule for the simulated packet. The DP rule manager 116 uses the specified portion of the network header for the simulated packet. The receipt of the simulated packet causes a third DP rule to be added to the flow table. The third DP rule maintains proper operation for the portion of the second DP rule that is not overlapping with the first DP rule. After the third DP rule is added to the flow table, the DP rule manager 116 can delete the second DP rule. The DP rule manager 116 can add, modify, or remove HW rules in the DPU hardware 208. The DPU hardware 208 can perform an action, associated with the HW rules, on subsequent network traffic data directed to the host device 202 from the second device.

In at least one embodiment, the DPU hardware 208 includes a data buffer to store the network traffic data 212. In at least one embodiment, the DPU hardware 208 creates a copy of the network traffic data 212 so that it can be sampled by the sampling logic 214 to extract the network header information described herein, the network header information being used for the simulated packets to create DP and HW rules without creating new software rules in the user space.

It should be noted that, unlike a CPU or a graphics processing unit (GPU), the DPU 204 is a new class of programmable processor that combines three key elements, including, for example: 1) an industry-standard, high-performance, software-programmable CPU (single-core or multi-core CPU), tightly coupled to the other SoC components; 2) a high-performance network interface capable of parsing, processing and efficiently transferring data at line rate, or the speed of the rest of the network, to GPUs and CPUs; and 3) a rich set of flexible and programmable acceleration engines that offload and improve applications performance for artificial intelligence (AI) and machine learning (ML), security, telecommunications, and storage, among others. These capabilities can enable an isolated, bare-metal, cloud-native computing platform for cloud-scale computing. In at least one embodiment, DPU 204 can be used as a stand-alone embedded processor. In at least one embodiment, DPU 204 can be incorporated into a network interface controller (also called a Smart Network Interface Card (SmartNIC)) used as a server system component. A DPU-based network interface card (network adapter) can offload processing tasks that the server system's CPU normally handles. Using its processor, a DPU-based SmartNIC may be able to perform any combination of encryption/ decryption, firewall, transport control protocol/Internet Protocol (TCP/IP), and HyperText Transport Protocol (HTTP) processing. SmartNICs can be used for high-traffic web servers, for example.

In at least one embodiment, DPU 204 can be configured for traditional enterprises' modern cloud workloads and high-performance computing. In at least one embodiment, DPU 204 can deliver a set of software-defined networking, storage, security, and management services at a data-center scale with the ability to offload, accelerate, and isolate data center infrastructure. In at least one embodiment, DPU 204 can provide multi-tenant, cloud-native environments with these software services. In at least one embodiment, DPU 204 can deliver data center services of up to hundreds of CPU cores, freeing up valuable CPU cycles to run businesscritical applications. In at least one embodiment, DPU 204 can be considered a new type of processor that is designed to process data center infrastructure software to offload and accelerate the compute load of virtualization, networking, storage, security, cloud-native AI/ML services, and other management services.

In at least one embodiment, the DPU 204 can include connectivity with packet-based interconnects (e.g., Ethernet), switched-fabric interconnects (e.g., InfiniBand, Fibre Channels, Omni-Path), or the like. In at least one embodiment, DPU 204 can provide a data center that is accelerated, fully programmable, and configured with security (e.g., zero-trust security) to prevent data breaches and cyberattacks. In at least one embodiment, the DPU 204 can include a network adapter, an array of processor cores, and infrastructure offload engines with full software programmability. In at least one embodiment, the DPU 204 can sit at an edge of a server to provide flexible, secured, high-performance cloud and AI workloads. In at least one embodiment, the DPU 204 can reduce the total cost of ownership and increase data center efficiency. In at least one embodiment, the DPU 204 can provide the software framework and acceleration libraries (e.g., NVIDIA DOCA™) that enable developers to rapidly create applications and services for the DPU 204, such as security services, virtualization services, networking services, storage services, AI/ML services, and management services. In at least one embodiment, the software framework and acceleration libraries make it easy to leverage hardware accelerators of the DPU 204 to provide data center performance, efficiency, and security. In at least one embodiment, the DPU 204 can be coupled to a GPU. The GPU can include one or more accelerated AI/ML pipelines.

In at least one embodiment, the DPU 204 can provide networking services with a virtual switch (vSwitch), a virtual router (vRouter), network address translation (NAT), load balancing, and network virtualization (NFV). In at least one embodiment, the DPU 204 can provide storage services, including NVME™ over fabrics (NVMe-oF™) technology, elastic storage virtualization, hyper-converged infrastructure (HCI) encryption, data integrity, compression, data deduplication, or the like. NVM Express™ is an open logical device interface specification for accessing non-volatile storage media attached via the Peripheral Component Interconnect Express® (PCIe) interface. NVMe-oF™ provides an efficient mapping of NVMe commands to several network transport protocols, enabling one computer (an "initiator") to access block-level storage devices attached to another computer (a "target") very efficiently and with minimum latency. The term "Fabric" is a generalization of the more specific ideas of network and input/output (I/O) channel. It essentially refers to an N: M interconnection of elements, often in a peripheral context. The NVMe-oF™ technology enables the transport of the NVMe command set over a variety of interconnection infrastructures, including networks (e.g., Internet Protocol (IP)/Ethernet) and I/O Channels (e.g., Fibre Channel). In at least one embodiment, the DPU 204 can provide hardware-accelerated services using Next-Generation Firewall (NGFW), Intrusion Detection Systems (IDS), Intrusion Prevention System (IPS), a root of trust, micro-segmentation, distributed denial-of-service (DDoS) prevention technologies, and ML detection using data extraction logic 214 and an ML detection system. NGFW is a network security device that provides capabilities beyond a stateful firewall, like application awareness and control, integrated intrusion prevention, and cloud-delivered threat intelligence. In at least one embodiment, the one or more network interfaces can include an Ethernet interface (single or dual ports) and an InfiniBand interface (single or dual ports). In at least one embodiment, the one or more host interfaces can include a PCIe interface and a PCIe switch. In at least one embodiment, the one or more host interfaces can include other memory interfaces. In at least one embodiment, the CPU can include multiple cores (e.g., up to 8 64-bit core pipelines) with L2 cache per one or two cores and L3 cache with eviction policies support for double data rate (DDR) dual in-line memory module (DIMM) (e.g., DDR4 DIMM support), and a DDR4 Dynamic Random Access Memory (DRAM) controller. Memory can be on-board DDR4 memory with error correction code (ECC) error protection support. In at least one embodiment, the CPU can include a single core with L2 and L3 caches and a DRAM controller. In at least one embodiment, one or more hardware accelerators can include a security accelerator, a storage accelerator, and a networking accelerator. In at least one embodiment, an ML detection system is hosted by the security accelerator. In at least one embodiment, the security accelerator can provide a secure boot with hardware root-of-trust, secure firmware updates, Cerberus compliance, Regular expression (RegEx) acceleration, IP security (IP-sec)/Transport Layer Security (TLS) data-in-motion encryption, AES-GCM 128/256-bit key for data-at-rest encryption (e.g., Advanced Encryption Standard (AES) with ciphertext stealing (XTS) (e.g., AES-XTS 256/512), secure hash algorithm (SHA) 256-bit hardware acceleration, Hardware public key accelerator (e.g., Rivest-Shamir-Adleman (RSA), Diffie-Hellman, Digital Signature Algorithm (DSA), ECC, Elliptic Curve Cryptography Digital Signature Algorithm (EC-DSA), Elliptic-curve Diffie-Hellman (EC-DH)), and True random number generator (TRNG). In at least one embodiment, the storage accelerator can provide BlueField SNAP-NVMe™ and VirtIO-blk, NVMe-oF™ acceleration, compression and decompression acceleration, and data hashing and deduplication. In at least one embodiment, the network accelerator can provide remote direct memory access (RDMA) over Converged Ethernet (ROCE) ROCE, Zero Touch ROCE, Stateless offloads for Transmission Control Protocol (TCP), IP, and User Datagram Protocol (UDP), Large Receive Offload (LRO), Large Segment Offload (LSO), checksum, Total Sum of Squares (TSS), Residual Sum of Squares (RSS), HTTP dynamic streaming (HDS), and virtual local area network (VLAN) insertion/stripping, single root I/O virtualization (SR-IOV), virtual Ethernet card (e.g., VirtIO-net), Multi-function per port, VMware NetQueue support, Virtualization hierarchies, and ingress and egress Quality of Service (QoS) levels (e.g., 1K ingress and egress QoS levels). In at least one embodiment, the DPU 204 can also provide boot options, including secure boot (RSA authenticated), remote boot over Ethernet, remote boot over Internet Small Computer System Interface (iSCSI), Preboot execution environment (PXE), and Unified Extensible Firmware Interface (UEFI).

In at least one embodiment, the DPU 204 can provide management services, including a 1 GbE out-of-band management port, network controller sideband interface (NC-SI), Management Component Transport Protocol (MCTP) over System Management Bus (SMBus), and Monitoring Control Table (MCT) over PCIe, Platform Level Data Model (PLDM) for Monitor and Control, PLDM for Firmware Updates, Inter-Integrated Circuit (I2C) interface for device control and configuration, Serial Peripheral Interface (SPI) interface to flash, embedded multi-media card (eMMC) memory controller, Universal Asynchronous Receiver/Transmitter (UART), and Universal Serial Bus (USB).

The host device 202 may be a desktop computer, a laptop computer, a smartphone, a tablet computer, a server, or any suitable computing device capable of performing the techniques described herein. In some embodiments, the host device 202 may be a computing device of a cloud-computing platform. For example, the host device 202 may be a server machine of a cloud-computing platform or a component of the server machine. In such embodiments, the host device 202 may be coupled to one or more edge devices (not shown) via the network 210. An edge device refers to a computing device that enables communication between computing devices at the boundary of two networks. For example, an edge device may be connected to host device 202, one or more data stores, one or more server machines via network 210, and may be connected to one or more endpoint devices (not shown) via another network. In such an example, the edge device can enable communication between the host device 202, one or more data stores, one or more server machines, and one or more client devices. In other or similar embodiments, host device 202 may be an edge device or a component of an edge device. For example, host device 202 may facilitate communication between one or more data stores, one or more server machines connected to host device 202 via network 210, and one or more client devices connected to host device 202 via another network.

In still other or similar embodiments, the host device 202 can be an endpoint device or a component of an endpoint device. For example, host device 202 may be, or may be a component of, devices, such as televisions, smartphones, cellular telephones, data center servers, data DPUs, personal digital assistants (PDAs), portable media players, netbooks, laptop computers, electronic book readers, tablet computers, desktop computers, set-top boxes, gaming consoles, a computing device for autonomous vehicles, a surveillance device, and the like. In such embodiments, host device 202 may be connected to the DPU 204 over one or more network interfaces via network 210. In other or similar embodiments, host device 202 may be connected to an edge device (not shown) via another network, and the edge device may be connected to the DPU 204 via network 210.

In at least one embodiment, the host device 202 executes one or more computer programs. One or more computer programs can be any process, routine, or code executed by the host device 202, such as a host OS, an application, a guest OS of a virtual machine, or a guest application, such as executed in a container. The host device 202 can include one or more CPUs of one or more cores, one or more multi-core CPUs, one or more GPUs, one or more hardware accelerators, or the like.

In at least one embodiment, one or more computer programs reside in a first computing domain (e.g., a host domain), and hardware-accelerated service reside in a second computing domain (e.g., DPU domain or infrastructure domain) different than the first computing domain. In at least one embodiment, the DPU 204 includes a direct memory access (DMA) controller (not illustrated in FIG. 2) coupled to a host interface. The DMA controller can read the data from the host's physical memory via a host interface. In at least one embodiment, the DMA controller reads data from the host's physical memory using the PCIe technology. Alternatively, other technologies can be used to read data from the host's physical memory. In other embodiments, the DPU 204 may be any computing system or computing device capable of performing the techniques described herein.

FIG. 3 is a flow diagram of processing flow 300 of two threads of a virtual switch according to at least one embodiment. In this embodiment, the virtual switch includes a first thread (e.g., DP thread or PMD thread) and a second thread (e.g., control thread or Revalidator). At a first step 302, the virtual switch samples the network traffic. All traffic is sampled and sent to the CPU for network processing. The sampling at the first step 302 can be done in a first table of a pipeline (e.g., Table 1). At a second step 304, the DP thread can receive the packets of the sampled traffic and write network headers to local memory, such as in a network header list 316. For each packet, the DP thread can add DP rule identifiers (rule UFID). The DP thread can drop packets (marked to be discarded). At a third step 306, the DP thread can add a new flow entry. For example, an existing entry of 1.1.1.1/16 in the hardware rules and the new rule is an overlapping entry of 1.1.1.1/32. The addition of the new entry at the third step 306 initiates the second thread (e.g., control thread or Revalidator). That is, the Revalidator is executed due to a flow table change. At a fourth step 308, the Revalidator calls the first thread (DP thread) with the rule UFID. At a fifth step 310, the first thread can get the rule UFID and compare it against the network header list 316. The first thread (DP thread) can simulate a simulated packet with the network header. After the new rule is created, the DP thread can delete the old rule.

FIG. 4 is a flow diagram of an example method 400 of avoiding disruption in network processing in a virtual switch according to at least one embodiment. The processing logic can be a combination of hardware, firmware, software, or any combination thereof. In at least one embodiment, the processing logic is implemented in a DPU, a switch, a network device, a GPU, a NIC, a CPU, or the like. In at least one embodiment, the processing logic is implemented in an acceleration hardware engine coupled to a switch. In at least one embodiment, method 400 may be performed by multiple processing threads, each thread executing one or more individual functions, routines, subroutines, or operations of the method. In at least one embodiment, processing threads implementing method 400 may be synchronized (e.g., using semaphores, critical sections, and/or other thread synchronization logic). Alternatively, processing threads implementing method 400 may be executed asynchronously with respect to each other. Various operations of method 400 may be performed differently than the order shown in FIG. 4. Some operations of the methods may be performed concurrently with other operations. In at least one embodiment, one or more operations shown in FIG. 4 may not always be performed.

Referring to FIG. 4, the processing logic begins with the processing logic sampling network traffic data at a specified sampling rate to generate a sampled copy of the network traffic data (block 402). At block 404, the processing logic stores a data path (DP) rule identifier and a specified portion of a network header for each packet of the sampled copy. At block 406, the processing logic identifies a change to a configuration setting of the virtual switch. The change to the configuration setting causes a first DP rule to be deleted in a flow table of the virtual switch. At block 408, before deleting the first DP rule, the processing logic simulates receipt of a simulated packet comprising the specified portion of the network header corresponding to a first DP rule identifier of the first DP rule. The receipt of the simulated packet causes a second DP rule to be added to the flow table. At block 410, after adding the second DP rule, the processing logic deletes the first DP rule.

In at least one embodiment, the processing logic stores the DP rule identifier and the specified portion of the network header for each packet in a list. The processing logic can determine that the first DP rule and the second DP rule overlap by comparing a first DP rule identifier of the first DP rule with the DP rule identifiers in the list and determining that at least a portion of the first DP rule identifier and the second DP rule identifier match. The processing logic generates the simulated packet with the specified portion of the network header corresponding to the second DP rule identifier.

In at least one embodiment, the storing, determining, simulating, and deleting are performed by a first thread. The processing logic can initiate a second thread in response to the addition of the first DP rule. The second thread sends a request to the first thread to delete the second DP rule. The request includes a first DP rule identifier of the first DP rule. The first thread compares the first DP rule identifier of the first DP rule against the DP rule identifiers to obtain a match with the second DP rule identifier. The first thread generates the simulated packet with the specified portion of the network header corresponding to the second DP rule identifier.

In at least one embodiment, the processing logic marks each packet of the sampled copy of the network traffic data with an indication to be discarded and discards each packet comprising the indication to be discarded after storing the DP rule identifier and the specified portion of the network header in a list.

In at least one embodiment, the processing logic marks the simulated packet with an indication to be discarded and discards the simulated packet after the third DP rule is added.

In at least one embodiment, the addition of the first DP rule occurs when a new flow entry is added to the flow table of a virtual switch that manages network traffic data in a virtualized environment. The processing logic determines that the first DP rule and the second DP rule in the flow table overlap by determining that the new flow entry and an existing flow entry overlap.

FIG. 5 is a flow diagram of an example method 500 of managing DP rules in a flow table in a virtual switch according to at least one embodiment. The processing logic can be a combination of hardware, firmware, software, or any combination thereof. In at least one embodiment, the processing logic is implemented in a DPU, a switch, a network device, a GPU, a NIC, a CPU, or the like. In at least one embodiment, method 500 may be performed by multiple processing threads, each thread executing one or more individual functions, routines, subroutines, or operations of the method. In at least one embodiment, processing threads implementing method 500 may be synchronized (e.g., using semaphores, critical sections, and/or other thread synchronization logic). Alternatively, processing threads implementing method 500 may be executed asynchronously with respect to each other. Various operations of method 500 may be performed differently than the order shown in FIG. 5. Some operations of the methods may be performed concurrently with other operations. In at least one embodiment, one or more operations shown in FIG. 5 may not always be performed.

Referring to FIG. 5, the processing logic begins with the processing logic sampling network traffic data at a specified sampling rate to generate a sampled copy of the network traffic data (block 502). At block 504, the processing logic stores a data path (DP) rule identifier and a specified portion of a network header for each packet of the sampled copy. At block 506, the processing logic identifies an addition of a first DP rule in a flow table. At block 508, the processing logic determines that the first DP rule and a second DP rule in the flow table overlap. The addition of the first DP rule causes a second DP rule to be deleted in the flow table. At block 510, before deleting the second DP rule, the processing logic simulates receipt of a simulated packet with the specified portion of the network header corresponding to a second DP rule identifier of the second DP rule. The receipt of the simulated packet causes a third DP rule to be added to the flow table. At block 512, after adding the third DP rule, the processing logic deletes the second DP rule.

In at least one embodiment, the specified portion of the network header includes at least one of: a source media access control (MAC) address; a destination MAC address; a source internet protocol (IP) address; a destination IP address; a source port; a destination port; a protocol identifier; a packet size; or a maximum packet size.

In at least one embodiment, the processing logic stores the DP rule identifier and the specified portion of the network header for each packet in a list. The processing logic can determine that the first DP rule and the second DP rule overlap by comparing a first DP rule identifier of the first DP rule with the DP rule identifiers in the list and determining that at least a portion of the first DP rule identifier and the second DP rule identifier match. The processing logic generates the simulated packet with the specified portion of the network header corresponding to the second DP rule identifier.

In at least one embodiment, the storing, determining, simulating, and deleting are performed by a first thread. The processing logic can initiate a second thread in response to the addition of the first DP rule. The second thread sends a request to the first thread to delete the second DP rule. The request includes a first DP rule identifier of the first DP rule. The first thread compares the first DP rule identifier of the first DP rule against the DP rule identifiers to obtain a match with the second DP rule identifier. The first thread generates the simulated packet with the specified portion of the network header corresponding to the second DP rule identifier.

In at least one embodiment, the processing logic marks each packet of the sampled copy of the network traffic data with an indication to be discarded and discards each packet comprising the indication to be discarded after storing the DP rule identifier and the specified portion of the network header in a list.

In at least one embodiment, the processing logic marks the simulated packet with an indication to be discarded and discards the simulated packet after the third DP rule is added.

In at least one embodiment, the addition of the first DP rule occurs when a new flow entry is added to the flow table of a virtual switch that manages network traffic data in a virtualized environment. The processing logic determines that the first DP rule and the second DP rule in the flow table overlap by determining that the new flow entry and an existing flow entry overlap.

In at least one embodiment, a computing system includes a DPU with a network interface, a host interface, a central processing unit (CPU), and an acceleration hardware engine. In at least one embodiment, the DPU is a programmable data center infrastructure on a chip. The DPU can implement a virtual switch. The virtual switch can receive mirrored network traffic data from the acceleration hardware engine. The virtual switch can sample the mirrored network traffic data to obtain sampled copy of the mirrored network traffic data. The virtual switch can store a data path (DP) rule identifier and a specified portion of a network header for each packet of the sampled copy. The virtual switch can identify an addition of a first DP rule in a flow table. In at least one embodiment, the specified portion of the network header comprises one or more fields corresponding to at least one of layer 2, layer 3, or layer 4 of the network header. The virtual switch can determine that the first DP rule and a second DP rule in the flow table overlap. The addition of the first DP rule causes a second DP rule to be deleted in the flow table. Before deleting the second DP rule, the virtual switch can simulate receipt of a simulated packet comprising the specified portion of the network header corresponding to a second DP rule identifier of the second DP rule. The receipt of the simulated packet causes a third DP rule to be added to the flow table. After adding the third DP rule, the virtual switch can delete the second DP rule.

In at least one embodiment, the virtual switch can mark the simulated packet with an indication to be discarded and discard the simulated packet after the third DP rule is added to the flow table.

In at least one embodiment, the virtual switch can store the DP rule identifier and the specified portion of the network header for each packet in a list. The virtual switch, to determine that the first DP rule and the second DP rule overlap, can compare a first DP rule identifier of the first DP rule with the DP rule identifiers in the list and determine that at least a portion of the first DP rule identifier and the second DP rule identifier match. The virtual switch can generate the simulated packet with the specified portion of the network header corresponding to the second DP rule identifier.

In at least one embodiment, a network device includes a network interface, a host interface, a processing device operatively coupled to the network interface and the host interface. The processing device can sample network traffic data at a specified sampling rate to generate a sampled copy of the network traffic data. The processing device can store a data path (DP) rule identifier and a specified portion of a network header for each packet of the sampled copy. The processing device can identify an addition of a first DP rule in a flow table. The processing device can determine that the first DP rule and a second DP rule in the flow table overlap in response to the addition of the first DP rule in the flow table. The addition of the first DP rule causes the second DP rule to be deleted in the flow table. Before the second DP rule is deleted, the processing device can simulate receipt of a simulated packet with the specified portion of the network header corresponding to a second DP rule identifier of the second DP rule. The receipt of the simulated packet causes a third DP rule to be added to the flow table. After the third DP rule is added, the processing device can delete the second DP rule.

In at least one embodiment, the network device is a switch coupled to a host device via the host interface. In at least one embodiment, the network device is a network interface card (NIC) coupled to a host device via the host interface. In at least one embodiment, the network device is a data processing unit (DPU) coupled to a host device via the host interface.

In at least one embodiment, a switch includes a set of port interfaces, memory to store instructions and a CPU operatively coupled to the memory and the port interfaces. The CPU can execute instructions to sample network traffic data at a specified sampling rate to generate a sampled copy of the network traffic data and store a data path (DP) rule identifier and a specified portion of a network header for each packet of the sampled copy. The CPU can execute instructions to identify an addition of a first DP rule in a flow table and determine that the first DP rule and a second DP rule in the flow table overlap in response to the addition of the first DP rule in the flow table. The addition of the first DP rule causes the second DP rule to be deleted in the flow table. Before the second DP rule is deleted, the CPU can execute instructions to simulate receipt of a simulated packet comprising the specified portion of the network header corresponding to a second DP rule identifier of the second DP rule. The receipt of the simulated packet causes a third DP rule to be added to the flow table. After the third DP rule is added, the CPU can execute instructions to delete the second DP rule.

Other variations are within the spirit of the present disclosure. Thus, while disclosed techniques are susceptible to various modifications and alternative constructions, certain illustrated embodiments thereof are shown in the drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in the appended claims.

Use of the terms "a" and "an" and "the" and similar referents in the context of describing disclosed embodiments (especially in the context of the following claims) are to be construed to cover both singular and plural, unless otherwise indicated herein or clearly contradicted by context, and not as a definition of a term. The terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of a set of A and B and C. For instance, in the illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media, and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors—for example, a non-transitory computer-readable storage medium stores instructions, and a main CPU executes some of the instructions while a GPU executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

The terms "coupled" and "connected," along with their derivatives, may be used in the description and claims. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout the specification terms such as "processing," "computing," "calculating," "determining," or the like, refer to action and/or processes of a computer or computing system or similar electronic computing devices, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or parallel, continuously, or intermittently. The terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or interprocess communication mechanism.

Although the discussion above sets forth example implementations of described techniques, other architectures may be used to implement the described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. An integrated circuit comprising:
memory;
a processing device operatively coupled to a host interface, a network interface, and the memory, wherein the processing device is to host a virtual switch, wherein the virtual switch is to:
identify an addition of a first data path (DP) rule in a flow table associated with the virtual switch;
determine that the first DP rule overlaps at least a second DP rule in the flow table in response to the addition of the first DP rule in the flow table; and
simulate receipt of a simulated packet to cause a third DP rule to be added to the flow table before deleting the second DP rule, wherein the first DP rule and the third DP rule are non-overlapping.

2. The integrated circuit of claim 1, wherein the integrated circuit is at least one of a data processing unit (DPU), a network interface card (NIC), or a switch, wherein the DPU is a programmable data center infrastructure on a chip.

3. The integrated circuit of claim 1, wherein the processing device comprises a first thread and a second thread, wherein the first thread processes packets of the network traffic data and adds or removes DP rules in the flow table, wherein the second thread is initiated in response to the addition of the first DP rule and sends, to the first thread, a request to delete the second DP rule, the request comprising a first DP rule identifier of the first DP rule.

4. The integrated circuit of claim 1, wherein the virtual switch is further to:
sample network traffic data at a specified sampling rate to generate a sampled copy of the network traffic data;
store a data path (DP) rule identifier and a specified portion of a network header for each packet of the sampled copy, wherein the addition of the first DP rule causes the second DP rule to be deleted in the flow table;
generate the simulated packet comprising the specified portion of the network header corresponding to a second DP rule identifier of the second DP rule; and
after the third DP rule is added, delete the second DP rule.

5. The integrated circuit of claim 4, wherein the specified portion of the network header comprises one or more fields corresponding to at least one of layer 2, layer 3, or layer 4 of the network header.

6. The integrated circuit of claim 4, wherein the virtual switch is to store the DP rule identifier and the specified portion of the network header for each packet in a list, and wherein the virtual switch, to determine that the first DP rule and the second DP rule overlap, is to:
compare a first DP rule identifier of the first DP rule with the DP rule identifiers in the list; and
determine that at least a portion of the first DP rule identifier and the second DP rule identifier match; and
generate the simulated packet comprising the specified portion of the network header corresponding to the second DP rule identifier.

7. The integrated circuit of claim 4, wherein the processing device comprises a first thread and a second thread, wherein:
the first thread is to add a rule to hardware to send packets with specific patterns to the processing device to sample the network traffic data;

the first thread is to store the DP rule identifier and the specified portion, determine that the first DP rule and the second DP rule in the flow table overlap, simulate the receipt of the simulated packet, and delete the second DP rule;

the second thread is initiated in response to the addition of the first DP rule;

the second thread is to send, to the first thread, a request to delete the second DP rule, the request comprising a first DP rule identifier of the first DP rule;

the first thread is to compare the first DP rule identifier of the first DP rule against the DP rule identifiers to obtain a match with the second DP rule identifier; and the first thread is to generate the simulated packet comprising the specified portion of the network header corresponding to the second DP rule identifier.

8. The integrated circuit of claim 1, wherein the virtual switch is further to:

mark the simulated packet with an indication to be discarded; and discard the simulated packet after the third DP rule is added to the flow table.

9. The integrated circuit of claim 1, wherein the addition of the first DP rule occurs when a new flow entry is added to the flow table of the virtual switch that manages network traffic data in a virtualized environment, wherein the virtual switch is to determine that the first DP rule and the second DP rule in the flow table overlap by determining that the new flow entry and an existing flow entry overlap.

10. The integrated circuit of claim 1, wherein the processing device is part of a virtual switch infrastructure implemented in at least one of a data processing unit (DPU), a network interface card (NIC), or a switch, wherein the DPU is a programmable data center infrastructure on a chip.

11. A method comprising:

identifying an addition of a first data path (DP) rule in a flow table associated with the virtual switch;

determining that the first DP rule overlaps at least a second DP rule in the flow table in response to the addition of the first DP rule in the flow table; and simulating receipt of a simulated packet to cause a third DP rule to be added to the flow table before deleting the second DP rule, wherein the first DP rule and the third DP rule are non-overlapping.

12. The method of claim 11, further comprising:

sampling network traffic data at a specified sampling rate to generate a sampled copy of the network traffic data;

storing a data path (DP) rule identifier and a specified portion of a network header for each packet of the sampled copy, wherein the addition of the first DP rule causes a second DP rule to be deleted in the flow table;

generating the simulated packet comprising the specified portion of the network header corresponding to a second DP rule identifier of the second DP rule; and after adding the third DP rule, deleting the second DP rule.

13. The method of claim 12, wherein the specified portion of the network header comprises at least one of: a source media access control (MAC) address; a destination MAC address; a source internet protocol (IP) address; a destination IP address; a source port; a destination port; a protocol identifier; a packet size; or a maximum packet size.

14. The method of claim 12, wherein storing the DP rule identifier and the specified portion of the network header for each packet comprises storing the DP rule identifier and the specified portion of the network header for each packet in a list, wherein determining that the first DP rule and the second DP rule overlap comprises:

comparing a first DP rule identifier of the first DP rule with the DP rule identifiers in the list; and determining that at least a portion of the first DP rule identifier and the second DP rule identifier match; and generating the simulated packet comprising the specified portion of the network header corresponding to the second DP rule identifier.

15. The method of claim 12, wherein the storing, determining, simulating, and deleting are performed by a first thread, and wherein the method further comprises:

initiating a second thread in response to the addition of the first DP rule;

sending, by the second thread to the first thread, a request to delete the second DP rule, the request comprising a first DP rule identifier of the first DP rule;

comparing, by the first thread, the first DP rule identifier of the first DP rule against the DP rule identifiers to obtain a match with the second DP rule identifier; and generating, by the first thread, the simulated packet comprising the specified portion of the network header corresponding to the second DP rule identifier.

16. The method of claim 12, further comprising:

marking the simulated packet with an indication to be discarded; and discarding the simulated packet after the third DP rule is added to the flow table.

17. A computing system comprising:

a data processing unit (DPU) comprising a network interface, a host interface, a central processing unit (CPU), and an acceleration hardware engine, the DPU to implement a virtual switch, wherein the virtual switch is to:

receive mirrored network traffic data from the acceleration hardware engine;

sample the mirrored network traffic data to obtain a sampled copy of the mirrored network traffic data;

store a data path (DP) rule identifier and a specified portion of a network header for each packet of the sampled copy;

identify an addition of a first DP rule in a flow table;

determine that the first DP rule and a second DP rule in the flow table overlap, wherein the addition of the first DP rule causes a second DP rule to be deleted in the flow table;

before deleting the second DP rule, simulate receipt of a simulated packet comprising the specified portion of the network header corresponding to a second DP rule identifier of the second DP rule, wherein the receipt of the simulated packet causes a third DP rule to be added to the flow table; and after adding the third DP rule, delete the second DP rule.

18. The computing system of claim 17, wherein the DPU is a programmable data center infrastructure on a chip.

19. The computing system of claim 17, wherein the specified portion of the network header comprises one or more fields corresponding to at least one of layer 2, layer 3, or layer 4 of the network header.

20. The computing system of claim 17, wherein the virtual switch is to store the DP rule identifier and the specified portion of the network header for each packet in a list, and wherein the virtual switch, to determine that the first DP rule and the second DP rule overlap, is to:

compare a first DP rule identifier of the first DP rule with the DP rule identifiers in the list; and determine that at least a portion of the first DP rule identifier and the second DP rule identifier match; and generate the simulated packet comprising the specified portion of the network header corresponding to the second DP rule identifier.

* * * * *